Nov. 29, 1960 A. WEISSFLOCH 2,961,759
METHOD OF MAKING STRETCHED WIRE GRIDS
Filed March 5, 1956
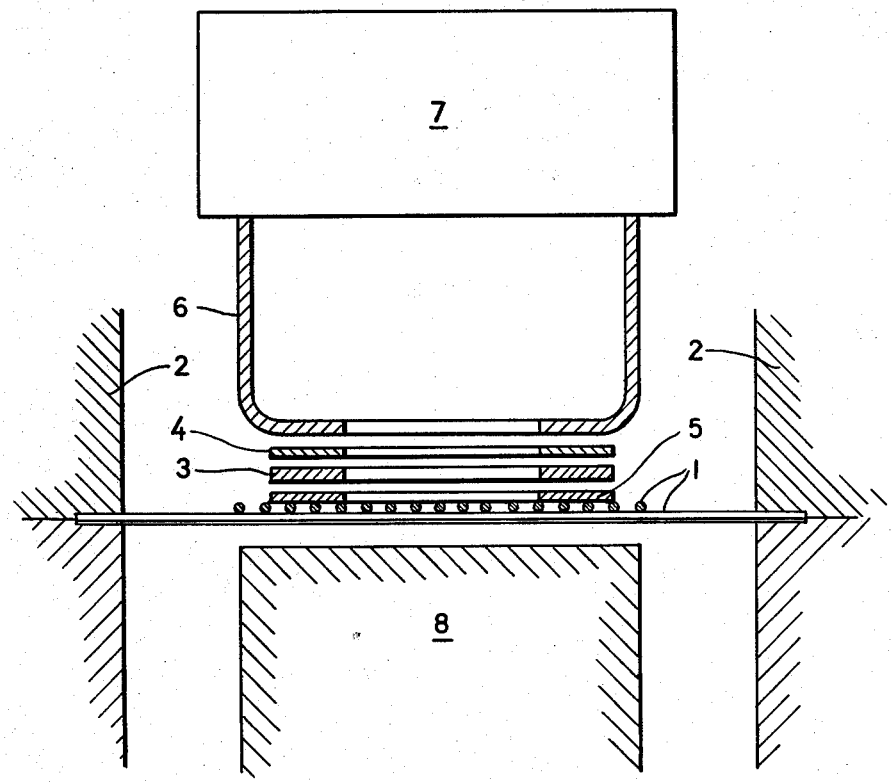
INVENTOR
*Andreas Weissfloch*
BY 
ATTORNEY United States Patent Office 2,961,759
Patented Nov. 29, 1960

2,961,759

METHOD OF MAKING STRETCHED WIRE GRIDS

Andreas Weissfloch, Munich, Germany, assignor to Siemens & Halske Aktiengesellschaft, Munich, Germany, a corporation of Germany Filed Mar. 5, 1956, Ser. No. 569,422

Claims priority, application Germany Apr. 19, 1955

5 Claims. (Cl. 29—452)

This invention is concerned with a method of and a device for making stretched wire grids for electrical discharge tubes and may be considered an improvement on the arrangement described in copending application Serial No. 495,839, filed March 22, 1955.

The method according to the above-noted copending application provides for holding the grid wires at points lying outside of the operatively effective grid area thereof, taking a stretching frame and pressing it with a defined pressure against the wires and thereby increasing the tension imparted thereto, and securing the wires on the stretching frame in defined position thereof, for example, by soldering or welding. The pulling tension imparted to the grid wires incident to the soldering or welding may be additionally secured by the provision of an intermediate plate member, disposed between the grid carrier and the corresponding wires, which is made of a material with the same or lower coefficient of expansion as the wires, and cools quicker than the wires. The intermediate plate or disk member and the wires may be made of any of the well known materials widely used in the vacuum tube for this purpose, such as tungsten, for example, while the grid carrier may likewise be made of any of the well known materials used in the vacuum tube art for this purpose, such as molybdenum, for example. This intermediate plate member must however be firmly connected with the grid carrier prior to the soldering or welding of the grid wires thereto, which is in most cases effected by electric spot welding, such procedure producing due to unfavorable transition impermissible high frequency sensitive areas. Even soldering with gold or gold-copper eutectic does not furnish a fully effective transition if it is not carried out with particular pressure, and results moreover in the disadvantage of requiring a relatively high soldering temperature with relative low ductility of the solder material. The different coefficients of expansion of the individual parts may release forces that may cause shearing apart at the soldering bones.

In accordance with an object and feature of the invention, two working steps which were previously successively applied are substituted by a single working step and a cheaper and lower melting ductile solder is used in place of the rather expensive gold solder.

In accordance with the invention, the soldering of the grid wires to the intermediate plate or disk member and the grid carrier is carried out simultaneously by applying a defined pressure affecting all parts.

The invention will be explained with reference to the accompanying diagrammatic drawing showing in simplified representation an example of a device for making a stretched grid. For the sake of simplicity of representation, only those details which are required for an understanding of the invention are shown in the drawing.

Numeral 1 indicates the grid wires which are to be soldered to the grid carrier ready for mounting in the ultimate structure. The grid wires may be arranged either in a row in parallelism or, as indicated in the drawing, in two or more layers and crossing at desired angles. The grid wires may however also be formed in the fashion of a wire mesh. The ends of the grid wires 1 are held in a holder device 2. The intermediate disk or plate member which is formed as an annular disk, is designated by 3, while two solder foils, one on each side thereof, are indicated by numerals 4 and 5. The grid carrier 6 is pressed during the soldering, by the plunger 7 upon the individual parts with a defined pressure, by means of a suitable weight or spring and the like. So far as the soldering is concerned, it is generally speaking immaterial whether the solder is applied to the grid carrier or to the intermediate disk member, or in the form a solder foil, soldering annulus and the like, as indicated in the drawing. The grid wires 1 are provided with a suitable coating; they may be gold plated, for example.

In order to carry out the soldering, preferably in a vacuum or in a protective gas atmosphere, there is provided below the solder zone a heating source 8 forming a surface which is approximated to the shape of the solder zone and can be adjustably disposed adjacent thereto within fractions of millimeters.

Any desired pulling tension close to the tensile stress limit may be imparted to the grid wires 1 by corresponding control of the various factors involved, including the soldering temperature, the soldering time, the spacing between the solder zone and the heating source, and the pressure applied. Suitable formation of the grid carrier 6 and plunger 7 additionally affect the wire tension upon cooling of the solder points inasmuch as the solder points cool quickly due to rapid heat radiation.

The method according to the invention even makes it possible to solder in one operation step with solder of different melting points. For example, the soldering between the grid carrier 6 and the intermediate disk member 3 and grid wires 1 may be effected with refined silver, while the gold plated mutually crossing grid wires may at the crossing points be simultaneously soldered together by means of refined gold, without causing ingress of the silver from the outer soldering area into the operatively effective grid plane.

Grids produced according to the invention exhibit high thermal and mechanical stability and strength.

Changes may be made within the scope and spirit of the appended claims which define what is believed new and desired to have protected by Letters Patent.

I claim:

1. A method of producing stretched wire grids for electrical discharge tubes comprising holding metallic wires which are to form a grid at points lying outside the ultimate operatively effective grid area thereof and placing tension on said wires, disposing an annular intermediate metallic member adjacent said tensioned wires at one side thereof and an annular metallic carrier adjacent said intermediate member, placing between said carrier and said intermediate member a first solder which alloys therewith responsive to heating thereof, placing between said intermediate member and said metallic wires a second solder, having a higher melting point than that of said first solder, which alloys therewith responsive to heating thereof, said carrier and said intermediate member and said wires being made from metals having melting points substantially higher than that of said first and said second solder and said intermediate member being made from a material having the same or lower coefficient of thermal expansion than the wires, pressing said carrier against said intermediate member and the latter against said tensioned wires to apply additional tension thereto, and applying heat to the opposite side of said tensioned wires to simultaneously melt said solders to effect soldering of said intermediate member to said carrier and said metallic wires and forming temperature differentials in different portions of the assembly to effect solidification of the first solder prior to that of said second solder.

2. A method according to claim 1, wherein said metallic wires are metal-plated and disposed in mutually crossing relationship, the plating metal of said wires being upon said heating operative as solder to join said wires at crossing points thereof.

3. A method according to claim 2, wherein the melting point of said first solder is lower than that of said plating metal.

4. A method according to claim 2, wherein the ductility of said first solder is higher than that of said plating metal.

5. A method according to claim 3, comprising effecting during said soldering heat transfer from the soldering zones by way of said carrier to hold the soldering zone affected by said solder of lower melting point at a temperature which is lower than the temperature of the zone affected by the solder of higher melting point, said heat transfer also effecting cooling of the soldering zones at a quicker rate than that of the grid wires.

References Cited in the file of this patent

UNITED STATES PATENTS

| | | |
|---|---|---|
| 1,804,624 | King | May 12, 1931 |
| 2,146,823 | Karmazin | Feb. 14, 1939 |
| 2,313,315 | Blais | Mar. 9, 1943 |
| 2,385,388 | Thoresen | Sept. 25, 1945 |
| 2,398,449 | Ronci | Apr. 16, 1946 |
| 2,451,360 | Skehan | Oct. 12, 1948 |
| 2,770,033 | Zarth | Nov. 13, 1956 |